(12) United States Patent
Bengson

(10) Patent No.: US 8,346,606 B2
(45) Date of Patent: Jan. 1, 2013

(54) DATA COLLECTION AND DISSEMINATION SYSTEM WITH TERMINAL HAVING LITERATURE DISTRIBUTION

(75) Inventor: Rick Robert Bengson, San Diego, CA (US)

(73) Assignee: Showing Suite, Inc., San Diego, CA (US)

( * ) Notice: Subject to any disclaimer, the term of this patent is extended or adjusted under 35 U.S.C. 154(b) by 767 days.

(21) Appl. No.: 12/173,409

(22) Filed: Jul. 15, 2008

(65) Prior Publication Data

US 2008/0275720 A1 Nov. 6, 2008

Related U.S. Application Data

(62) Division of application No. 11/408,212, filed on Apr. 20, 2006.

(60) Provisional application No. 60/728,042, filed on Oct. 17, 2005, provisional application No. 60/772,531, filed on Feb. 10, 2006.

(51) Int. Cl.
*G06Q 30/00* (2012.01)
(52) U.S. Cl. .................................. 705/14.65; 705/14.37
(58) Field of Classification Search ................ 705/14.65, 705/14.37
See application file for complete search history.

(56) References Cited

U.S. PATENT DOCUMENTS

| | | | |
|---|---|---|---|
| 3,357,133 A | 12/1967 | Helsing | |
| 4,674,041 A | 6/1987 | Lemon | |
| 4,817,043 A | 3/1989 | Brown | |
| D318,553 S | 7/1991 | Brown | |
| 5,235,680 A | 8/1993 | Bijnagte | |
| 5,754,850 A | 5/1998 | Janssen | |
| 5,860,362 A | 1/1999 | Smith | |
| 6,068,159 A * | 5/2000 | Rodriguez Reyes et al. | 221/232 |
| 6,123,259 A | 9/2000 | Ogasawara | |
| 6,976,032 B1 | 12/2005 | Hull | |
| 7,242,967 B2 | 7/2007 | Yamakawa | |
| 7,617,114 B1 | 11/2009 | Tooke | |
| 2001/0034607 A1 | 10/2001 | Perschbacher | |
| 2002/0046122 A1* | 4/2002 | Barber et al. | 705/17 |

(Continued)

FOREIGN PATENT DOCUMENTS

WO WO 9935600 7/1999

OTHER PUBLICATIONS

"The Credit Union Journal Asked, 'Do Your Facilities Need a Makeover?' and Readers Responded, 'Oh, Yeah! Just Take a Look At This.'" by: Great Basin Federal Credit Union; Credit Union Journal, v8, n40, p. 16, Oct. 4, 2004.*

(Continued)

*Primary Examiner* — John Weiss
*Assistant Examiner* — Michael Stibley
(74) *Attorney, Agent, or Firm* — McAndrews, Held & Malloy, Ltd.

(57) ABSTRACT

Certain embodiments of the present invention provide a system for collecting and disseminating customer data and for distributing real estate marketing literature. The system includes a customer terminal, which is in communication with a data center, which, in turn, is in communication with a business terminal. The customer terminal includes a device for inputting customer data and a device for distributing relevant marketing literature. The customer data is sent to the data center, where it is stored for subsequent retrieval by a sales person using the business terminal.

12 Claims, 4 Drawing Sheets

U.S. PATENT DOCUMENTS

| | | | |
|---|---|---|---|
| 2002/0156704 A1* | 10/2002 | Kolls | 705/27 |
| 2002/0161476 A1 | 10/2002 | Panofsky | |
| 2003/0083957 A1 | 5/2003 | Olefson | |
| 2003/0195652 A1* | 10/2003 | Gotfried | 700/235 |
| 2004/0046798 A1 | 3/2004 | Alen | |
| 2005/0002514 A1 | 1/2005 | Shafiee | |
| 2005/0021404 A1 | 1/2005 | Schoder | |
| 2005/0149406 A1 | 7/2005 | Bascobert | |
| 2005/0149432 A1* | 7/2005 | Galey | 705/38 |
| 2005/0160022 A1 | 7/2005 | Chesney | |
| 2005/0200638 A1 | 9/2005 | Silverbrook | |
| 2005/0204378 A1 | 9/2005 | Gabay | |
| 2005/0216347 A1 | 9/2005 | Williams | |
| 2005/0229451 A1 | 10/2005 | Mullens | |
| 2006/0041542 A1 | 2/2006 | Hull | |
| 2006/0075303 A1 | 4/2006 | Ulruch | |
| 2007/0055583 A1 | 3/2007 | Davis | |

OTHER PUBLICATIONS

Beyaztas, B., "Sainsbury's in Kiosk Offer," Marketing, Mar. 19, 1998.

Byrne, A., "Discovering Ireland Is Not Cheap With a {Pounds} 5 Service Charge," Irish Times, City Edition, p. 2, Jan. 27, 2001.

* cited by examiner

DATA COLLECTION AND DISSEMINATION SYSTEM WITH TERMINAL HAVING LITERATURE DISTRIBUTION

RELATED APPLICATIONS

This application claims priority from, and is a divisional of, U.S. patent application Ser. No. 11/408,212, filed Apr. 20, 2006, which claims priority from U.S. Provisional Patent Application Ser. No. 60/728,042, filed Oct. 17, 2005, and U.S. Provisional Patent Application Ser. No. 60/772,531, filed Feb. 10, 2006. U.S. patent application Ser. No. 11/408, 212 and U.S. Provisional Patent Application Ser. Nos. 60/728,042 and 60/772,531 are hereby incorporated by reference.

BACKGROUND OF THE INVENTION

In the field of real estate, and in particular the new home market, there is a need to identify customers that may potentially purchase homes. Such customers—often called "leads"—typically attend an "open house" or showcase weekend with the goal of evaluating a property to determine if they want to purchase it. At a showcase weekend, real estate professionals such as sales people try to meet each customer personally and, in the process, ascertain customer data such as his or her name, contact information, price range, and property preferences.

In some instances, showcase weekends are so busy that, regardless of the sales staff's efforts, some customers visit the property but are never approached personally. In these situations, a never approached customer may become discouraged because his or her questions regarding the property are not answered. Moreover, because the promotional materials are expensive to produce (especially for upscale communities), marketing literature (e.g., brochures, pamphlets, flyers, and the like) is rarely left out for pickup. Accordingly, customers often leave a showcase weekend with little or no information regarding the property and its offerings while the sales staff fails to collect leads.

Additionally, even when a sales person has the ability to talk directly with a customer, that customer may prefer not to interface directly with the sales person. For example, the customer may be intimidated by overly aggressive salespeople; or, the customer may simply want to view the property, retrieve relevant marketing literature, and leave without investing much time.

Thus, a need exists for a device that can—without the involvement of a sales person—collect customer data, provide customers with relevant marketing literature, and disseminate the customer data to the sales staff.

BRIEF SUMMARY OF THE INVENTION

Certain embodiments of the present invention provide a system for collecting and disseminating customer data and for distributing marketing literature. The system includes a customer terminal, which is linked (by wire or wirelessly) to a data center, which, in turn, is linked (by wire or wirelessly) to a business terminal.

A customer can input his customer data into the customer terminal and receive real estate marketing literature dispensed or otherwise made available by the customer terminal. The data center receives the customer data from the customer terminal and stores it. A sales person can operate the business terminal to access the customer data from the data center.

In use, a customer may approach a customer terminal positioned in the lobby of the sales office of a new community and filled with real estate marketing literature related to one or more of the properties being sold within that community. The customer inputs his or her name, contact information, price range, and purchase criteria. The customer terminal (or data center) then determines which product literature is relevant to the customer, and provides that literature to the customer. Information regarding the customer's name, contact information, price range, purchase criteria, and what literature he or she was provided is transmitted to the data center. Subsequently, sales people can use the business terminals to access such information to follow up on the "leads".

Optionally, the customer terminal can be configured to provide the same product literature to all customers. Thus, there would be no need for determining which product literature to provide to a customer.

Optionally, a terminal can function as both a customer terminal and a business terminal for use by both customers and sales people (at different times). Such a terminal can send customer data to the data center and access customer data from the data center.

Optionally, a terminal can function as a customer terminal, business terminal, and data center. Such a terminal can collect customer data from customers and store it locally for later retrieval by sales people.

DETAILED DESCRIPTION OF THE INVENTION

Figure 1:
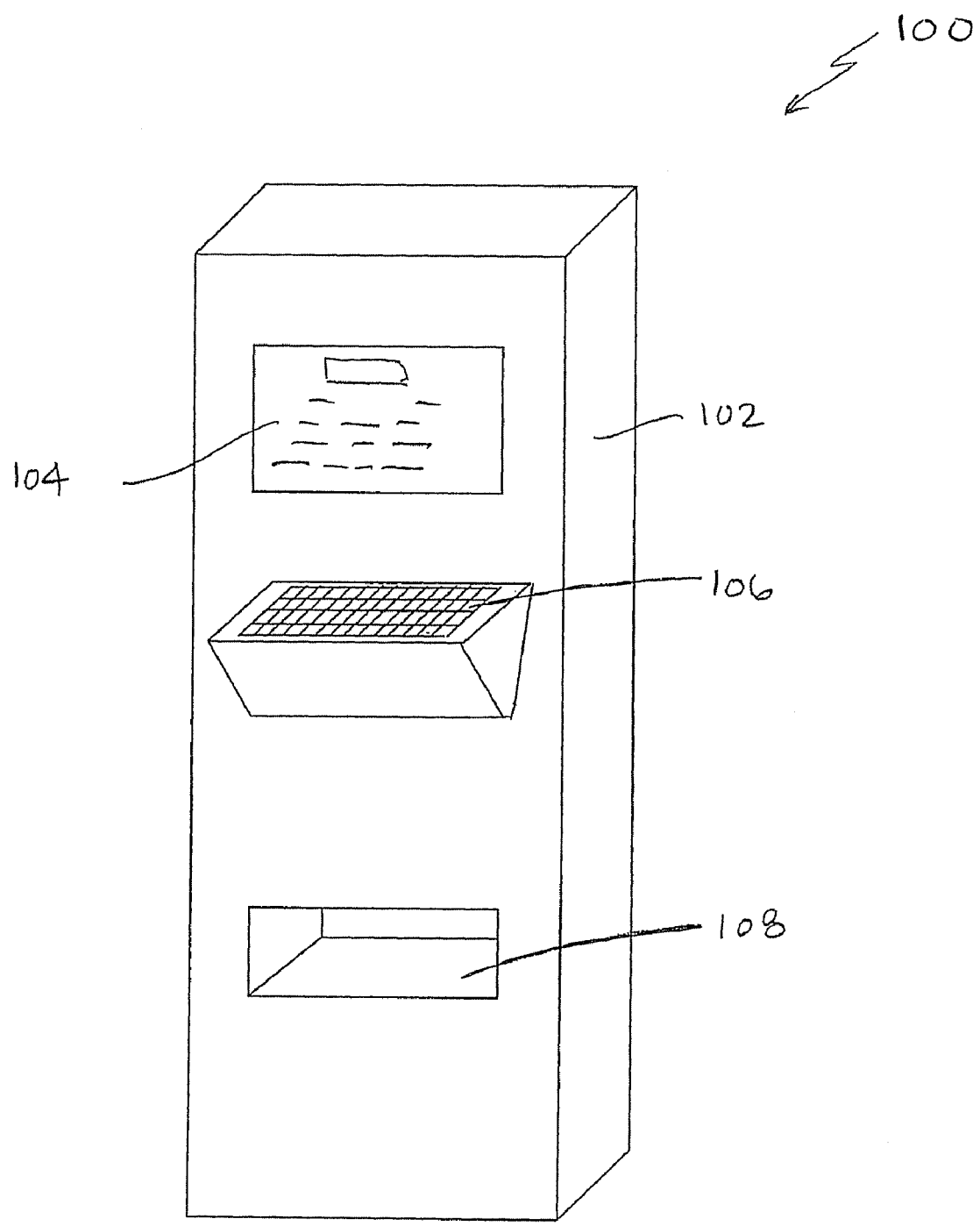
FIG. 1 illustrates a perspective view of a customer terminal according to an embodiment of the present invention.

FIG. 1 illustrates a customer terminal 100 that may be used to collect data from real estate customers (e.g., potential buyers) and distribute to them real estate marketing literature (e.g., brochures, pamphlets, flyers, and the like). The customer terminal 100 includes a chassis 102 that houses a display 104, keyboard 106, and trough 108 along a front surface 110 of the chassis 102. While the chassis 102 is depicted as substantially rectangular, it is to be appreciated that the shape is merely exemplary of a preferred embodiment. The chassis 102 is configured to support the remaining components of the customer terminal 100.

The chassis 102 also houses a controller, memory, and a literature bin that are located fully within the chassis 102 and not illustrated. The literature bin is loaded by an operator with marketing literature.

The display 104 may be any known display device capable of displaying information for a customer to view. For example, the display 104 could comprise a video screen employing CRT, LCD, DLP, or LCOS technology; or, also for example, the display 104 could comprise a LED. The display 104 is controlled by the controller in accordance with program software stored in the memory and input received by the keyboard 106.

The trough 108 is configured to receive marketing literature dispensed from the literature bin in response to a customer's input at the keyboard 106.

Figure 2:
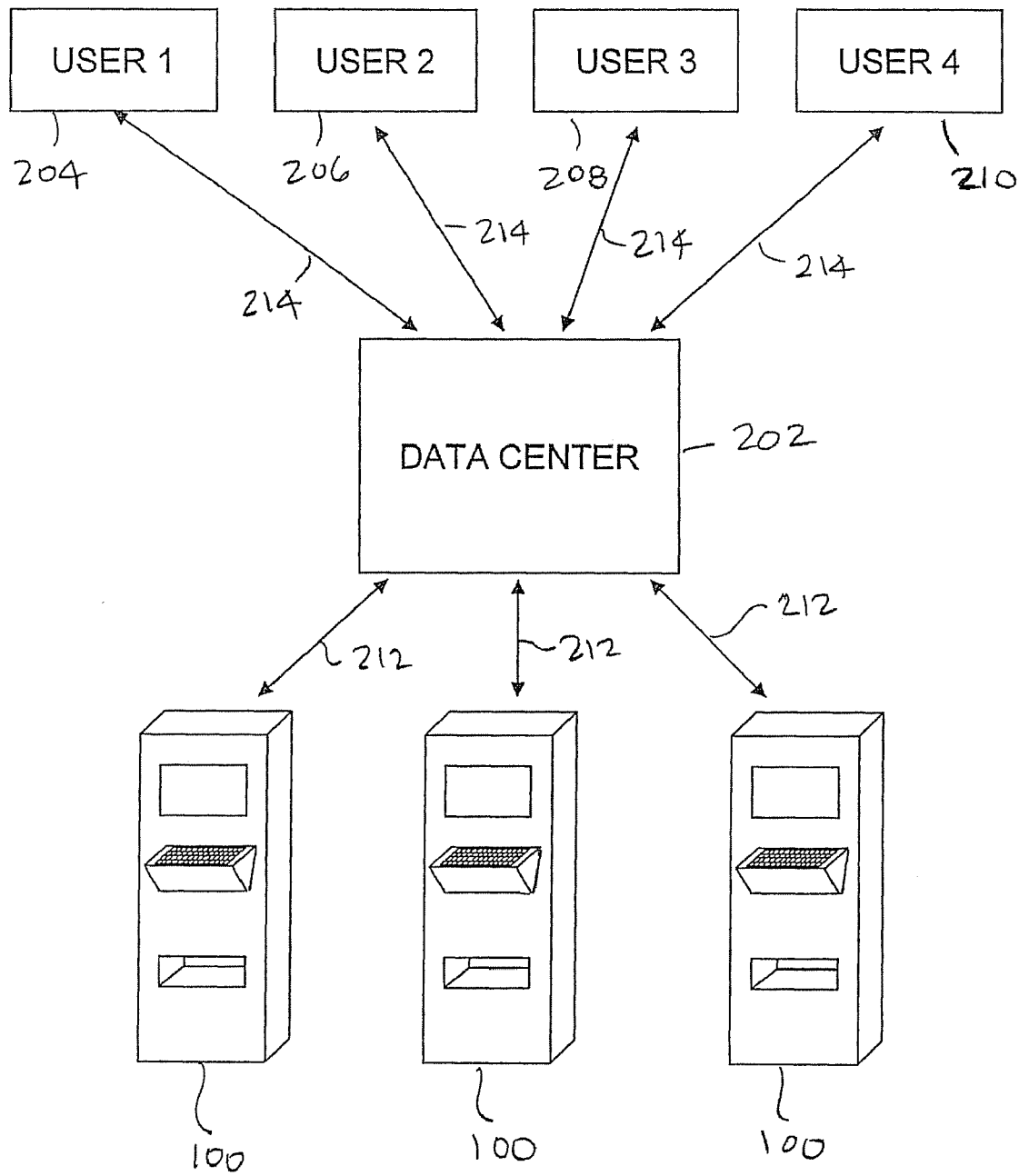
FIG. 2 illustrates a block diagram of a system for collecting and disseminating customer data and for distributing marketing literature according to an embodiment of the present invention.

FIG. 2 illustrates a block diagram of a system 200 for collecting and disseminating customer data and for distributing marketing literature. The system 200 includes a plurality of customer terminals 100 connected to a data center 202 via communication links 212. The communication links 212 may be wired or wireless. A wired communication link 212, for example, could be established through a modem, cable internet connection, direct wired electrical connection, or any other known wired connection. A wireless communication link 212, for example, could be established through a wireless LAN, wireless WAN, cellular communication channel, or any other known wireless connection.

The system 200 also includes a plurality of business terminals 204, 206, 208, and 210 connected to the data center 202 via communication links 214. Like the communication links 212, the communication links 214 may be wired or wireless. Optionally, the business terminals 204, 206, 208, and 210 may be personal computers with Internet access.

Figure 3:
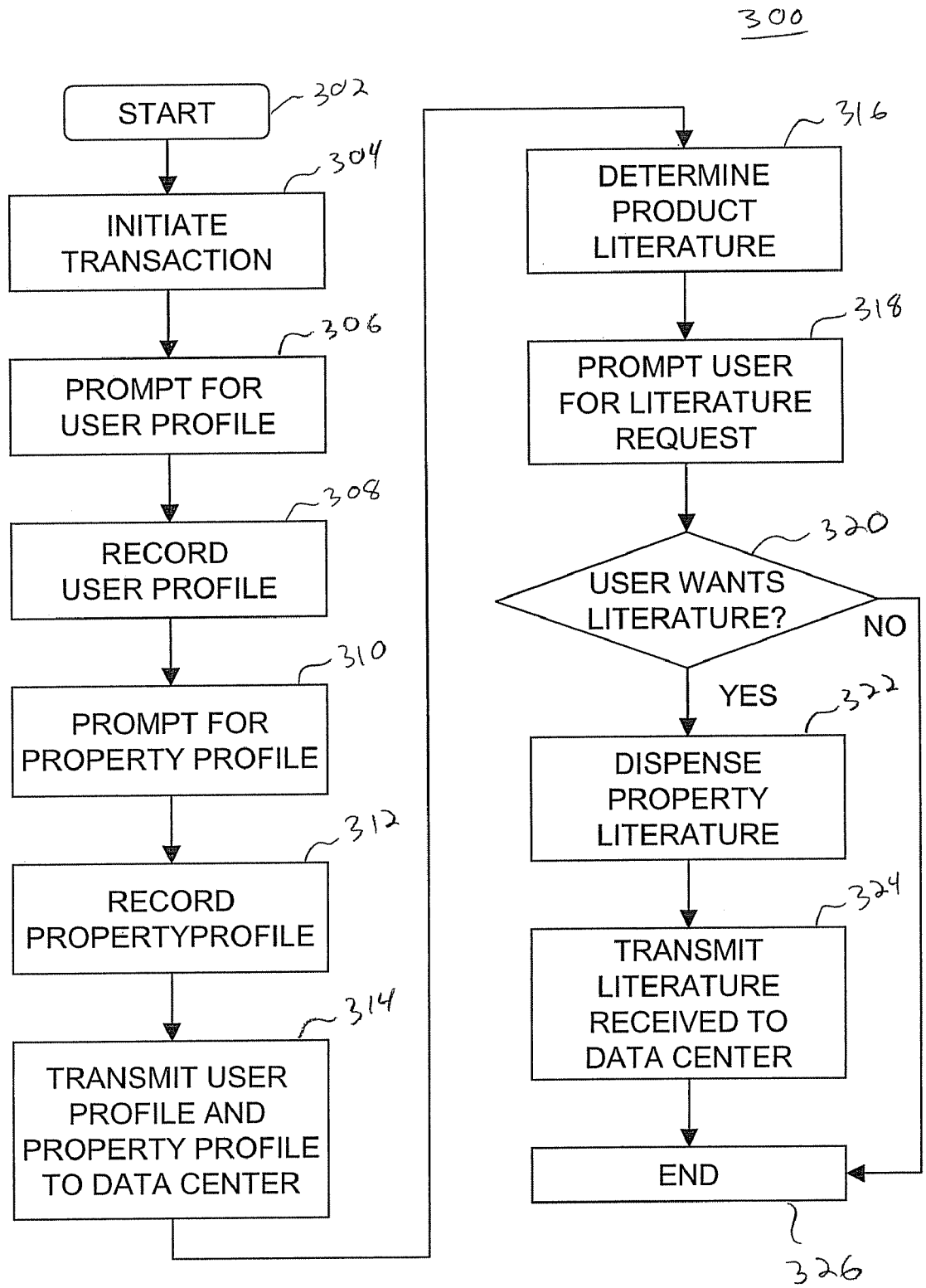
FIG. 3 illustrates a flowchart of a method of operation of a customer terminal according to an embodiment of the present invention.

FIG. 3 illustrates a flowchart of a preferred method of operation 300 of the customer terminal 100. The method 300 comprises a number of steps 302-326 (odd numbers excluded). The method 300 begins and proceeds in response to customer input using the keyboard 106. For example, at step 302, the customer may hit the "enter" button on the keyboard 106 in response to an instruction on a "welcome screen" on the display 104. At step 304, a customer may hit the "y" button in response to whether or not he wishes to initiate a transaction.

Once initiated, the display 104 on the customer terminal 100 prompts the customer to input a user profile in step 306. The user profile is then recorded in step 308 to the memory located within the customer terminal 100. Optionally, the user profile may be immediately transmitted to the data center 202. The user profile solicited from, and input by, customers may vary. However, a typical user profile may include the following, and may be displayed in a table on the display 104 as follows:

| DATA TYPE | DATA INPUT |
|---|---|
| NAME | John Customer |
| ADDRESS | 2346 Fake St. |
| CITY | SAN DIEGO |
| STATE | CA |
| ZIP CODE | 92118 |
| EMAIL | JOHNDOE@EMAIL.COM |
| PHONE NO. | (619) 555-9923 |
| HOW DID YOU HEAR ABOUT US? | Internet |
| PROPERTY CRITERIA | 2 BR/2 BA |
| TIME TO PURCHASE | 6 Months |
| PRICE RANGE | $450,000-$600,000 |
| WORKING WITH AN AGENT? | Yes |
| IF SO, WHO? | Joe Broker |
| AGENCY | Roe & Joe Real Estate |
| AGENT PHONE NO. | (858) 555-3456 |

It is to be appreciated that the user profile outlined in the Table above is merely exemplary of the types of user profiles which might be input at the customer terminal 100.

After the user profile is input, the method 300 proceeds to step 310, which prompts the customer to input data regarding properties in which he is interested in order to create a property profile. The property profile may include specific properties, architectural styles, floor plans, models, etc. of which the customer is interested. The property profile is then recorded in step 312 to the memory located within the customer terminal 100.

In step 314, the customer terminal 100 transmits the user profile and property profile (both of which are generally referred to herein as customer data) to the data center 202. The data center 202 stores the customer data on an internally-located memory (not shown). Additionally, in step 318, the data center 202, through use of an internally-located controller (not shown), analyzes the customer data to determine which pieces of marketing literature the customer terminal 100 should potentially disseminate to the customer.

In step 318, the display 104 asks the customer whether he or she wants to receive marketing literature. If the customer declines the offer by, for example, pressing button "n" on the keyboard 106, the method 300 proceeds to step 326 and ends.

If the customer accepts the offer by, for example, pressing button "y" on the keyboard 106, the method 300 proceeds to step 322, and the applicable marketing literature is dispensed into the trough 108. The customer can then retrieve the marketing literature from the trough 108.

Optionally, the customer terminal 100 can be configured to dispense the applicable marketing literature only after verifying a portion of the customer's user profile. For example, the customer terminal 100 (or the data center 202) could send an email to the email address provided to verify that it is a valid email address. If the email address is invalid, the customer terminal 100 (or the data center 202) should receive a "bounced back" email or error message. Thus, the system 200 can be configured to provide for the dispensing of marketing materials only if a "bounced back" email or error message is not received within a set period of time, such as 5 seconds.

In step 324, the customer terminal 100 informs the data center 202 that the applicable literature was dispensed. The method 300 then ends at step 326.

A short lag time after the method 300 ends, step 302 is automatically activated and the "welcome screen" returns to the display 104.

The customer data that is stored in the data center 202 can be downloaded to, or otherwise accessed by, the business terminals 204, 206, 208, and 210, Thus, sales people may use the business terminals 204, 206, 208, and 210 to access the user profiles and property profiles of customers in order to follow up on leads, better identify potential buyers, identify customers that do not have agents, and more efficiently match customers with the properties of their interest.

Figure 4:
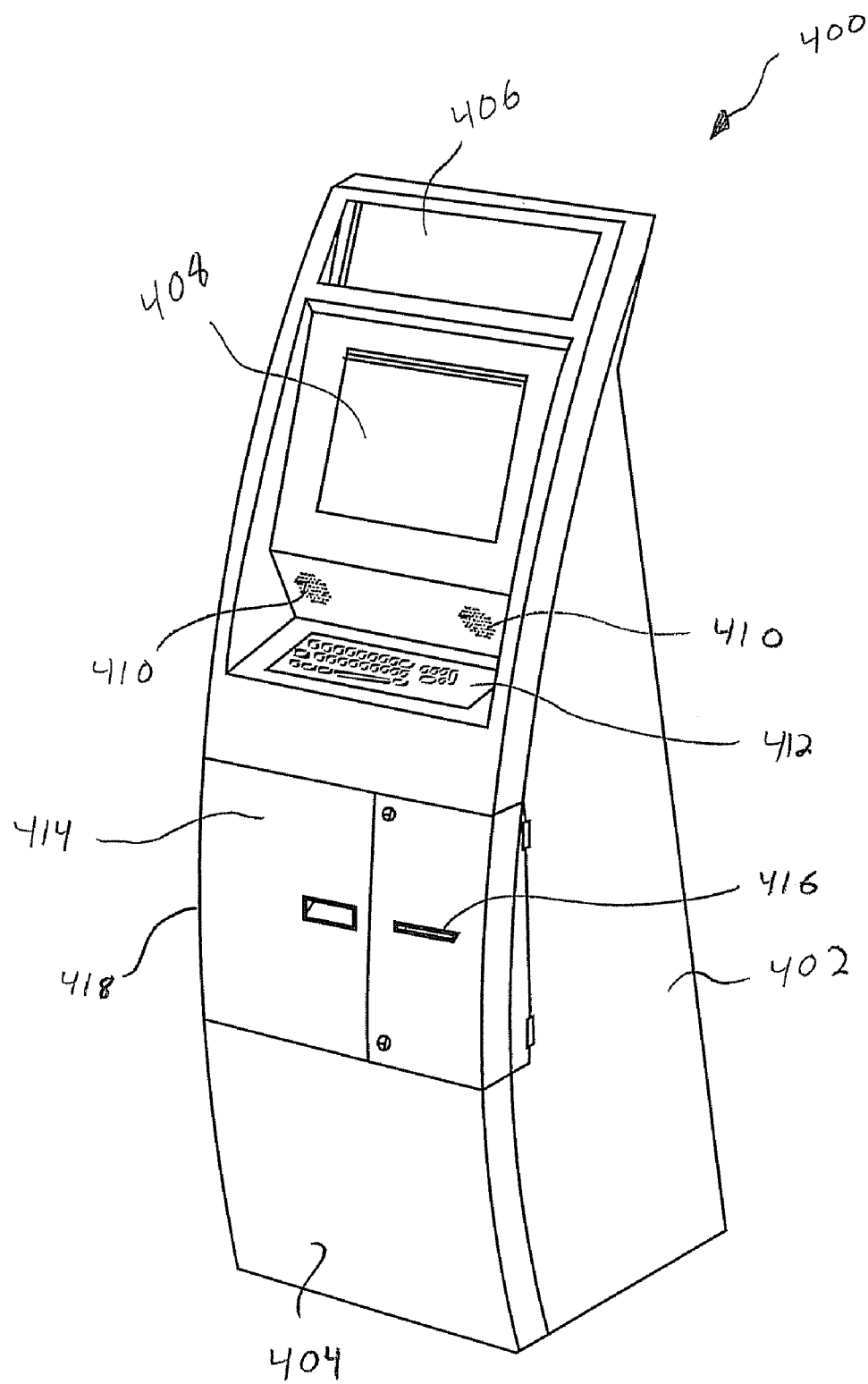
FIG. 4 illustrates a perspective view of an alternative customer terminal according to an embodiment of the present invention.

FIG. 4 illustrates an alternative customer terminal 400 in accordance with an embodiment of the present invention. The customer terminal 400 includes a chassis 402 that has a convex front surface 404. The front surface 404 includes a placard holder 406, display 408, left and right audio speakers 410, keyboard 412, door 414, and printer slot 416.

While the chassis 402 is depicted as having a convex front surface 404, it is to be appreciated that the shape of the chassis 402 is merely exemplary of a preferred embodiment. The chassis 402 is configured to support the other components of the customer terminal 400.

The chassis 402 also houses a controller, memory, literature bin, and printer that are located fully within the chassis 402 and not illustrated. The literature bin is loaded by an operator with marketing literature and is accessible via the door 414, which swings open along hinges (not shown) positioned along a right edge 418 of the front surface 404.

The customer terminal 400 is similar to that of the customer terminal 100 but with some notable differences. The customer terminal 400 includes the placard holder 406, which allows an operator to exhibit a placard identifying, for example, the new community, the builder, and/or the sales company. Further, unlike the customer terminal 100, the customer terminal 400 can prompt the customer through audio output (as well as visual output) due to the addition of the speakers 410. Also, the customer terminal 400 can print material on demand via the printer, which is located inside the customer terminal 400 and not illustrated, and dispense the printed material through the printer slot 416. Additionally, while the customer terminal 100 dispenses marketing literature from a customer-inaccessible literature bin to a customer-accessible trough 108, the customer terminal 400 provides customer access to the literature bin via the door 414. The door 414 is controlled by the controller of the customer terminal 400 and only unlocks in response to appropriate input on the keyboard 412.

While certain embodiments of the present invention provide immediate access to marketing literature, other embodiments may provide for the distribution of marketing material via other delivery methods, such as by mail and email.

While certain embodiments of the present invention distribute marketing literature, other embodiments may provide for the distribution of marketing material in a digital form such as on a CD or other digital media.

While certain embodiments of the present invention describe a keyboard as a customer input device, other embodiments may include alternative input devices such as a keypad, touch-screen, mouse, trackball, or microphone.

While certain embodiments of the present invention describe a data center that determines which pieces of marketing literature the customer terminal should disseminate to a customer, other embodiments may include customer terminals that make the determination locally (without instructions from the data center).

While certain embodiments of the present invention describe a system for collecting and disseminating customer data and for distributing marketing literature comprising a data center, customer terminals, and business terminals, other embodiments may include dual use terminals that function as both customer terminals and business terminals.

While certain embodiments of the present invention describe a system for collecting and disseminating customer data and for distributing marketing literature comprising a data center, customer terminals, and business terminals, other embodiments may include a stand-alone terminal that can collect and store a customer's data for later retrieval by a sales person, and distribute marketing material to the customer.

While certain embodiments of the present invention distribute real estate marketing literature, other embodiments may provide for the distribution of literature regarding other industries or matters.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for collecting customer data and for distributing pre-printed material, the system comprising:
    a customer terminal comprising:
        a user interface including a user input device;
        a display;
        a bin configured to hold and distribute said pre-printed material, including a brochure, pamphlet, or flyer; and
        a non-transitory computer readable medium that stores instructions, which upon execution, cause the customer terminal to:
            prompt via the display the entry of customer data including a user profile and a property profile, wherein said user profile includes a name and one or more of the group consisting of mailing address, email address, and telephone number, and wherein said property profile includes one or more of the group consisting of a property, a price, a price range, and a model;
            receive from the user interface said customer data entered via the input device; and
            upon entry of said customer data, distribute from said bin said pre-printed material; and
    a data center that receives and stores one or more of said user profile and said property profile.

2. The system of claim 1 wherein said pre-printed material is determined by the customer terminal to be relevant to a customer based on the analysis of the property profile inputted by a customer prior to the distribution of said pre-printed material.

3. The system of claim 1 wherein said customer terminal distributes said pre-printed material after at least a portion of said user profile is verified by said customer terminal or said data center.

4. The system of claim 1, wherein said customer terminal or said data center causes an email to be sent to an email address corresponding to said user profile, said email comprising material determined to be relevant to a customer based on an analysis of said property profile inputted by a customer.

5. The system of claim 1, wherein said customer terminal or said data center causes printed material to be mailed to a street address corresponding to said user profile, said printed material is determined to be relevant to a customer based on an analysis of said property profile inputted by a customer.

6. The system of claim 1, wherein said wherein said property profile includes one or more of the group consisting of a real property, real property price range, and real property model.

7. A system for collecting customer data and for distributing pre-printed material, the system comprising:
    a customer terminal comprising:
        a user interface including a user input device;
        a display;
        a bin configured to hold and distribute said pre-printed material, including a brochure, pamphlet, or flyer; and
        a non-transitory computer readable medium that stores instructions, which upon execution, cause the customer terminal to:
            prompt via the display the entry of customer data including a user profile and a real property profile, wherein said user profile includes a name and one or more of the group consisting of mailing address, email address, and telephone number, and wherein said real property profile includes one or more of the group consisting of a real property, a real property price range, a real property model, a real property floor plan, and a real property architectural style.
            receive from the user interface said customer data entered via the input device; and
            upon entry of said customer data, distribute from said bin said pre-printed material; and a data center that receives and stores one or more of said user profile and said real property profile.

8. The system of claim 7 wherein said pre-printed material is determined by the customer terminal to be relevant to a customer based on the analysis of the real property profile inputted by a customer prior to the distribution of said pre-printed material.

9. The system of claim 7 wherein said customer terminal distributes said pre-printed material after at least a portion of said user profile is verified by said customer terminal or said data center.

10. The system of claim 7, wherein said customer terminal or said data center causes an email to be sent to an email address corresponding to said user profile, said email comprising material determined to be relevant to a customer based on an analysis of said real property profile inputted by a customer.

11. The system of claim 7, wherein said customer terminal or said data center causes printed material to be mailed to a street address corresponding to said user profile, said printed material is determined to be relevant to a customer based on an analysis of said real property profile inputted by a customer.

12. A system for collecting data and for distributing pre-printed material, the system comprising:

a terminal comprising:
  a user interface including a user input device;
  a display;
  a bin configured to hold and distribute said pre-printed material, including a brochure, pamphlet, or flyer; and
  a non-transitory computer readable medium that stores instructions, which upon execution, cause the terminal to:
    prompt via the display the entry of data including a user profile and a property profile, wherein said user profile includes a name and one or more of the group consisting of mailing address, email address, and telephone number, and wherein said property profile includes one or more of the group consisting of a property, a price, a price range, and a model;
    receive from the user interface said data entered via the input device; and
    upon entry of said data, distribute from said bin said pre-printed material; and
a data center that receives and stores one or more of said user profile and said property profile.

\* \* \* \* \*